United States Patent
Yuan et al.

(10) Patent No.: US 11,915,421 B2
(45) Date of Patent: Feb. 27, 2024

(54) AUDITING TASK PERFORMANCE

(71) Applicant: Mineral Earth Sciences LLC, Mountain View, CA (US)

(72) Inventors: Zhiqiang Yuan, San Jose, CA (US); Elliott Grant, Woodside, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 344 days.

(21) Appl. No.: 17/467,888

(22) Filed: Sep. 7, 2021

(65) Prior Publication Data
US 2023/0074663 A1 Mar. 9, 2023

(51) Int. Cl.
*G06T 7/00* (2017.01)
*G06V 20/10* (2022.01)
*G06V 20/68* (2022.01)

(52) U.S. Cl.
CPC ............ *G06T 7/0012* (2013.01); *G06V 20/10* (2022.01); *G06T 2207/20081* (2013.01); *G06T 2207/20084* (2013.01); *G06T 2207/30188* (2013.01); *G06V 20/68* (2022.01)

(58) Field of Classification Search
CPC ........ G09B 23/38; G09B 19/003; G09B 5/06; G06T 7/0004; G06T 11/60
See application file for complete search history.

(56) References Cited

U.S. PATENT DOCUMENTS

| | | | | |
|---|---|---|---|---|
| 5,253,302 | A * | 10/1993 | Massen | B07C 5/10 |
| | | | | 348/E13.019 |
| 10,241,097 | B2 * | 3/2019 | Miresmailli | G01D 11/30 |
| 10,638,667 | B2 * | 5/2020 | Regan | A01G 22/00 |
| 10,871,480 | B2 * | 12/2020 | Miresmailli | G01D 11/30 |
| 11,256,915 | B2 * | 2/2022 | Li | G06V 10/82 |
| 11,287,411 | B2 * | 3/2022 | Miresmailli | G01N 33/0098 |

OTHER PUBLICATIONS

Talaviya et al., (Implementation of artificial intelligence in agriculture for optimisation of irrigation and application of pesticides and herbicides Artificial Intelligence in Agriculture 4 (2020) pp. 58-73.

(Continued)

*Primary Examiner* — Yosef Kassa
(74) *Attorney, Agent, or Firm* — Gray Ice Higdon (57) ABSTRACT

Implementations are described herein for auditing performance of large-scale tasks. In various implementations, one or more ground-level vision sensors may capture a first set of one or more images that depict an agricultural plot prior to an agricultural task being performed in the agricultural plot, and a second set of one or more images that depict the agricultural plot subsequent to the agricultural task being performed in the agricultural plot. The first and second sets of images may be processed in situ using edge computing device(s) based on a machine learning model to generate respective pluralities of pre-task and post-task inferences about the agricultural plot. Performance of the agricultural task may include comparing the pre-task inferences to the post-task inferences to generate operational metric(s) about the performance of the agricultural task in the agricultural plot. The operational metric(s) may be presented at one or more output devices.

20 Claims, 6 Drawing Sheets

(56) References Cited

OTHER PUBLICATIONS

"AI in Agriculture—Present Applications and Impact" Retrieved from https://emerj.com/ai-sector-overviews/ai-agriculture-present-applications-impact. 15 pages. Dated Jul. 22, 2021.
Cinar et al., "Machine Learning in Predictive Maintenance Towards Sustainable Smart Manufacturing in Industry 4.0" Sustainability 2020, 12, 8211; doi:10.3390/su12198211. 42 pages.
Qayyum et al., "The Data-Driven Audit: How Automation and AI are Changing the Audit and the Role of the Auditor" 2020 Chartered Professional Accountants of Canada. 34 pages.
Kokina et al., "The Emergence of Artificial Intelligence: How Automation is Changing Auditing" Journal of Emerging Technologies in Accounting. vol. 14, No. 1. 2017. pp. 115-122.

* cited by examiner

CAPTURE A FIRST SET OF ONE OR MORE IMAGES THAT DEPICT AN AGRICULTURAL PLOT PRIOR TO AN AGRICULTURAL TASK BEING PERFORMED IN THE AGRICULTURAL PLOT
502

PROCESS THE FIRST SET OF ONE OR MORE IMAGES *IN SITU* USING ONE OR MORE OF THE EDGE COMPUTING DEVICES BASED ON A MACHINE LEARNING MODEL TO GENERATE A PLURALITY OF PRE-TASK INFERENCES ABOUT THE AGRICULTURAL PLOT
504

CAPTURE A SECOND SET OF ONE OR MORE IMAGES THAT DEPICT THE AGRICULTURAL PLOT SUBSEQUENT TO THE AGRICULTURAL TASK BEING PERFORMED IN THE AGRICULTURAL PLOT
506

PROCESS THE SECOND SET OF ONE OR MORE IMAGES *IN SITU* USING ONE OR MORE OF THE EDGE COMPUTING DEVICES BASED ON THE MACHINE LEARNING MODEL TO GENERATE A PLURALITY OF POST-TASK INFERENCES ABOUT THE AGRICULTURAL PLOT
508

AUDIT PERFORMANCE OF THE AGRICULTURAL TAS, WHEREIN THE AUDITING INCLUDES A COMPARISON OF THE PLURALITY OF PRE-TASK INFERENCES TO THE PLURALITY OF POST-TASK INFERENCES TO GENERATE ONE OR MORE OPERATIONAL METRICS ABOUT THE PERFORMANCE OF THE AGRICULTURAL TASK IN THE AGRICULTURAL PLOT
510

CAUSE ONE OR MORE OF THE OPERATIONAL METRICS TO BE PRESENTED AT ONE OR MORE OUTPUT DEVICES
512

AUDITING TASK PERFORMANCE

BACKGROUND

Auditing performance of tasks at scale may be cumbersome and/or costly. For example, as agricultural fields increase in size, so too does the scope of agricultural tasks performed in those fields, such as harvesting plant-parts-of-interest, weed remediation, pest/disease remediation, etc. Deploying auditing personnel to manually inspect such work in a comprehensive manner may be too costly and/or time-consuming. Yet, if the auditing personnel only inspect some of the work, they may fail to detect subpar performance in other, uninspected parts of the agricultural field.

SUMMARY

Implementations are described herein for auditing performance of large scale tasks, such as agricultural tasks. More particularly, but not exclusively, implementations are described herein for leveraging edge-based resources, such as agricultural robots and/or computing nodes mounted on farm machinery, to obtain image(s) that depict an area in which a large-scale task is performed, such as a crop field, both before and after performance of the task. These images may be processed to determine pre-task and post-task states of the area in question. In many implementations, this processing may include application of one or more machine learning models to the imagery data, such as a convolutional neural network (CNN) that is trained to detect objects of interest, such as targeted plant-parts-of-interest (e.g., flowers, fruit, vegetables, seeds, pods, etc.), weeds, pests, disease, and so forth. The pre-task and post-task states may then be compared to generate one or more operational metrics that appraise, grade, evaluate, and/or quantify a quality of the performance of the large-scale task.

In various implementations, a method implemented using one or more edge computing devices may include: capturing, using one or more ground-level vision sensors, a first set of one or more images that depict an agricultural plot prior to performance of an agricultural task performed in the agricultural plot; processing the first set of one or more images in situ using one or more of the edge computing devices based on a machine learning model to generate a plurality of pre-task inferences about the agricultural plot; capturing, using one or more of the ground-level vision sensors, a second set of one or more images that depict the agricultural plot subsequent to the performance of agricultural task in the agricultural plot; processing the second set of one or more images in situ using one or more of the edge computing devices based on the machine learning model to generate a plurality of post-task inferences about the agricultural plot; auditing performance of the agricultural task, wherein the auditing includes comparing the plurality of pre-task inferences to the plurality of post-task inferences to generate one or more operational metrics about the performance of the agricultural task in the agricultural plot; and causing one or more of the operational metrics to be presented at one or more output devices.

In various implementations, the one or more operational metrics may include a heat map of the agricultural plot. In various implementations, portions of the heat map may be colored or shaded based on relative changes between the pre-task and post-task states of the agricultural plot.

In various implementations, the machine learning model may be a weed detection model, and one or more of the operational metrics may convey effectiveness of weed remediation. In various implementations, one or more of the operational metrics may indicate a measure of weeds that were left unremediated. In various implementations, a first operational metric of the one or more of the operational metrics may indicate a proportion of weeds in the agricultural plot that were treated mechanically or chemically. In various implementations, a second operational metric of the operational metrics may be determined based on the first operational metric. The second operational metric may indicate whether the agricultural task complied with an organic farming standard.

In various implementations, the machine learning model may be trained to generate an inference that identifies a targeted plant part. In various implementations, the agricultural task may be harvesting the targeted plant part. In various implementations, one or more of the operational metrics may indicate a decrease in instances of the targeted plant part being detected in the second set of one or more images relative to the first set of one or more images. In various implementations, one or more of the operational metrics may include a measure of ripe fruits or vegetables that were left unharvested. In various implementations, one or more of the operational metrics may be a measure of unusable fruits or vegetables that were harvested.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for auditing performance of large scale tasks, such as agricultural tasks. More particularly, but not exclusively, implementations are described herein for leveraging edge-based resources, such as agricultural robots and/or computing nodes mounted on farm machinery, to obtain image(s) that depict an area in which a large-scale task is performed, such as a crop field, both before and after performance of the task. These images may be processed to determine pre-task and post-task states of the area in question. In many implementations, this processing may include application of one or more machine learning models to the imagery data, such as a convolutional neural network (CNN) that is trained to detect objects of interest, such as targeted plant-parts-of-interest (e.g., flowers, fruit, vegetables, seeds, pods, etc.), weeds, pests, disease, and so forth. The pre-task and post-task states may then be compared to generate one or more operational metrics that appraise, grade, evaluate, and/or quantify a quality of the performance of the large-scale task.

As one example, one or more human personnel may be tasked with harvesting one or more strawberry fields. The personnel may be instructed to pick only those strawberries that have a particular color (e.g., red) that indicates ripeness. Strawberries of other colors, such as unripe green strawberries, should be left on the plants. Sometime before harvest, a first set of pre-task image(s) of the strawberry field may be captured, e.g., by one or more agricultural robots and/or low-flying unmanned aerial vehicles (UAVs). Sometime after harvest, a second set of post-task image(s) may be captured in a similar fashion.

A CNN trained to annotate (e.g., with bounding shapes or pixel wise annotations) ripe and/or unripe strawberries may be used to process both the pre-task and post-task imagery. The annotations of the pre-task imagery may represent a pre-task state of the strawberry field and the annotations of the post-task imagery may represent a post-task state of the strawberry field. The pre-task annotations and post-task annotations may be compared to generate one or more operational metrics for how well the personnel performed in harvesting strawberries. For example, a count of pre-task ripe strawberries may be compared to a count of post-task ripe strawberries to determine an efficiency of the harvest, how many ripe strawberries were left unharvested, etc. As another example, a count of pre-task unripe strawberries may be compared to a count of post-task unripe strawberries to determine how careless the personnel were in harvesting unusable strawberries.

As another example, performance of weed remediation in a field may be audited. A variety of different operational metrics may be generated from such an audit. For example, pre-weed-remediation and post-weed-remediation imagery may be processed using machine learning model(s) such as a CNN to compare weed counts before and after remediation, e.g., to determine weed remediation efficiency, effectiveness, etc. In some implementations, a machine learning model may be trained to detect, in imagery data, a manner in which weeds were remediated, which may be relevant for purposes of determining whether surrounding crops qualify as organic. For example, a CNN may be trained to detect weeds that are lodged or wilted, as opposed to being missing as a result of having been pulled or otherwise mechanically remediated. The former may not be permitted as an organic farming practice, in contrast with the latter.

In some implementations, the post-weed-remediation imagery may be captured after some selected time interval following remediation. This time interval may be selected in various ways. A short time interval (e.g., immediately following remediation) may provide an early indication of remediation effectiveness. However, if roots of mechanically-remediated weeds are allowed to remain in the ground, those weeds may grow back. Accordingly, a longer time interval may be selected to determine how effectively entire weeds—including roots—were remediated. In some implementations, operational metrics may be weighted and/or annotated with confidence measures that are selected based on such time intervals. For example, a weed remediation efficacy measure determined from images captured immediately (e.g., minutes or hours) after remediation may be assigned a different confidence measure than a subsequent weed remediation efficacy measure determined from images captured days or weeks later.

Operational metrics may be presented in a variety of ways. In some implementations, a heat map may be presented that represents a change or "delta" between a field before and after performance of an agricultural task. Such a heat map may allow a farmer to see, for instance, that while the task was performed effectively and/or efficiently in some areas of the field (e.g., those most easily accessible for manual audit), in other areas of the field (e.g., more remote), the task was performed less effectively and/or efficiently. Additionally or alternatively, a heat map may be used to gauge performance of individual personnel, e.g., for performance review and/or training purposes. For example, a portion of the field handled by worker A may have been more effectively harvested than another portion of the field handled by worker B. The locations of these workers may be tracked, for instance, using GPS technology, vision sensors, proximity sensors dispersed in the field, time sheets, etc.

Figure 1:
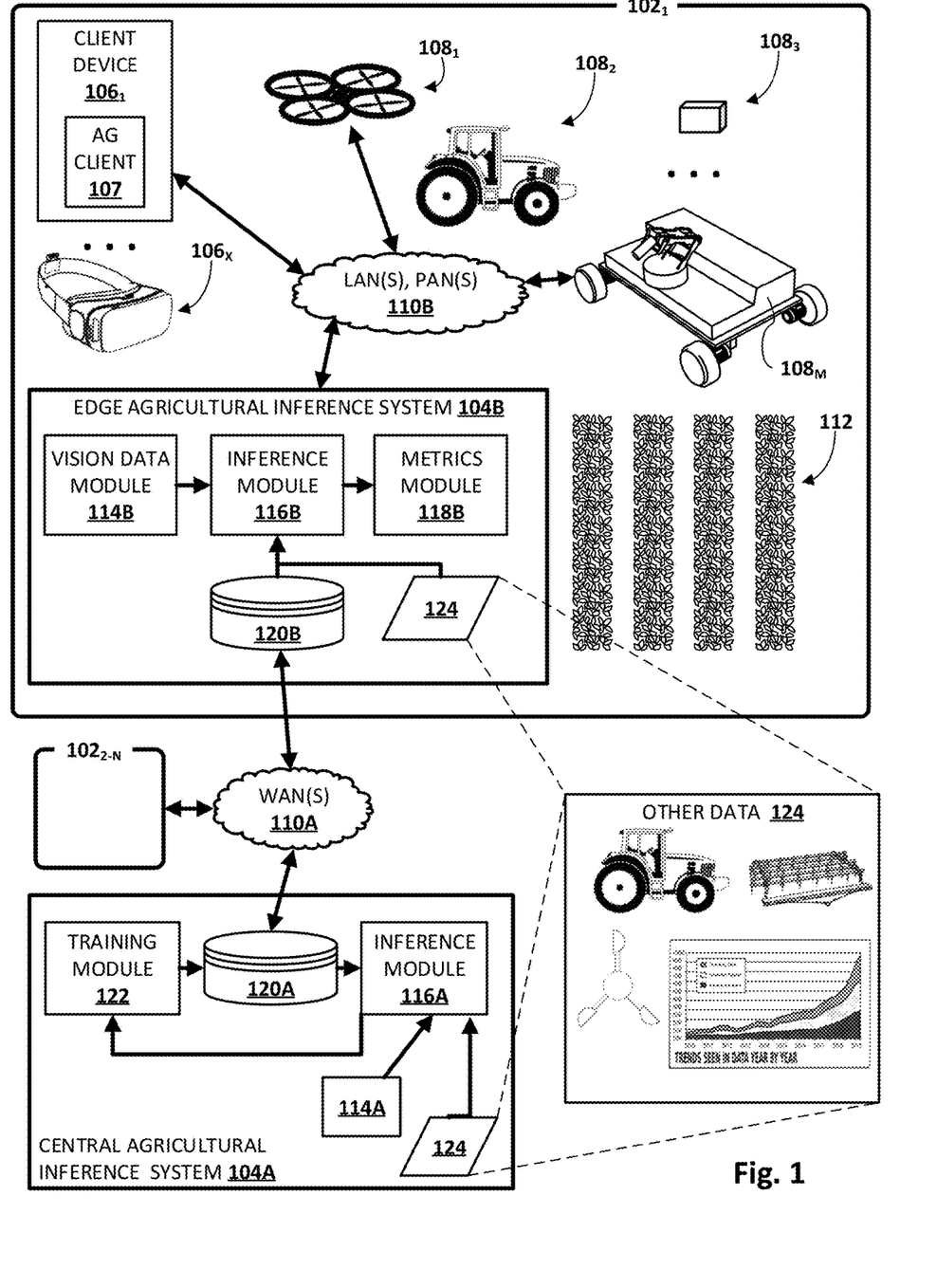
FIG. 1 schematically depicts an example environment in which selected aspects of the present disclosure may be employed in accordance with various implementations.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. However, this is not meant to be limiting. Techniques described here may be useful in any domain in which a difficult-to-audit task is performed across a large geographic area.

The environment of FIG. 1 includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, sugar beets, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and in which large-scale agricultural tasks such as harvesting, weed remediation, fertilizer application, herbicide application, planting, tilling, etc. are performed. Each edge site 102 may include the same or similar components as those depicted in FIG. 1 as part of edge site $102_1$.

In various implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network for which techniques described herein may be particularly beneficial. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 and some farm equipment 108 may operate a variety of different applications that may be used, for instance, to obtain and/or analyze various agricultural inferences (real time and delayed) that were generated using techniques described herein. For example, a first client device $106_1$ operates an agricultural (AG) client 107 (e.g., which may be standalone or part of another application, such as part of a web browser) that may allow the user to, among other things, view operational metrics for agricultural tasks performed across field 112. Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruit/vegetables of crops, weeds, crop yield predictions, performance metrics for agricultural tasks, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes $108_3$. An edge computing node $108_3$ may be a modular and/or portable data processing device and/or sensor package that, for instance, may be carried through an agricultural field 112, e.g., by being mounted on another piece of farm equipment (e.g., on a boom affixed to tractor $108_2$ or to a truck) that is driven through field 112 and/or by being carried by agricultural personnel. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences.

These inferences may include, for instance, auditable inferences (or signals) that can be used for generating operational metrics for performance of large-scale agricultural tasks in field 112. As used herein, an inference/signal is auditable if it can be verified for accuracy, e.g., visually in the images themselves or in the field. For instance, some inferences take the form of bounding boxes that envelop some object of interest, such as a weed, a plant-part-of-interest, etc. Bounding boxes can be audited simply by allowing a person to view the underlying image with the bounding boxes added as annotations; the person can visually confirm or refute that the bounding boxes do, in fact, envelop the objects they are supposed to envelop. Alternatively, a person could walk through a field to location(s) at which the objects were identified and confirm that those objects are present or absent.

In some examples, one or more of the components depicted as part of edge agricultural inference system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural inference system 104B, or as being performed "in situ," it should be understood that those operations may be performed by one or more edge computing nodes $108_3$, and/or may be performed by one or more other computing devices at the edge 102, such as on client device(s) 106.

In various implementations, edge agricultural inference system 104B may include a vision data module 114B, an edge inference module 116B, and a metrics module 118B. Edge agricultural inference system 104B may also include one or more edge databases 120B for storing various data used by and/or generated by modules 114B, 116B, and 118B, such as vision and/or other sensor data gathered by farm equipment 108$_{1-M}$, agricultural inferences, machine learning models that are applied and/or trained using techniques described herein to generate agricultural inferences, auditable inferences generated by inference module 116B, and so forth. In some implementations one or more of modules 114B, 116B, and/or 118B may be omitted, combined, and/or implemented in a component that is separate from edge agricultural inference system 104B.

In various implementations, central agricultural inference system 104A may be implemented across one or more computing systems that may be referred to as the "cloud." Central agricultural inference system 104A may receive massive sensor data generated by farm equipment 108$_{1-M}$ (and/or farm equipment at other edge sites 102$_{2-N}$) and process it using various techniques, including but not limited to application of machine learning state machines generated using techniques described herein, to make agricultural inferences.

However, the agricultural inferences generated by central agricultural inference system 104A may be delayed, e.g., by the time required to physically transport portable data devices (e.g., hard drives) from edge sites 102$_{1-N}$ to central agricultural inference system 104A, and/or by the time required by central agricultural inference system 104A to computationally process this massive data. Agricultural personnel (e.g., farmers) at edge sites 102 may desire agricultural inferences, such as inferences about performance of an agricultural task, much more quickly than this. Moreover, farmers may value the privacy of their data and may prefer that their data not be sent to the cloud for processing. Accordingly, in various implementations, techniques described herein for auditing performance of large-scale tasks may be implemented in situ at edge agricultural inference system 104B if possible/feasible, and at central agricultural inference system 104A if necessary/beneficial. Although not depicted identical to edge agricultural inference system 104B, central agricultural inference system 104A may include the same or similar components as edge agricultural inference system 104B.

In some implementations, vision data module 114B may be configured to provide sensor data to edge inference module 116B. In some implementations, the vision sensor data may be applied, e.g., continuously and/or periodically by edge inference module 116B, as input across one or more machine learning models stored in edge database 120B to generate auditable inferences detected in/on one or more plants in the agricultural field 112. Inference module 116B may process the targeted inference data in situ at the edge using one or more of the machine learning models stored in database 120B. In some cases, one or more of these machine learning model(s) may be stored and/or applied directly on farm equipment 108, such as edge computing node 108$_3$, to make targeted inferences about plants of the agricultural field 112.

As noted previously, various types of machine learning models may be applied by inference modules 118A/B to generate crop yield predictions (real time and delayed). Additionally, various types of machine learning models may be used to generate image embeddings that are applied as input across the various machine learning models. These various models may include, but are not limited to, various types of recurrent neural networks (RNNs) such as long short-term memory (LSTM) or gated recurrent unit (GRU) networks, transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, cover crop history, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

Metrics module 118B may be configured to audit performance of a performed agricultural task in situ using one or more of the edge computing devices, such as modular computing device 108$_3$. This auditing may include, for instance, comparing a plurality of pre-task inferences generated by inference module 116B to a plurality of post-task inferences generated by inference module 116B to generate one or more operational metrics about the performance of the agricultural task in the field 112. In some implementations, these operational metrics may take the form of and/or be presented as statistics, such as percentage of plant-parts-of-interest harvested (or left unharvested), percentage of weeds remediated (or left unremediated), cover crop coverage percentage, percentage good versus bad tillage practices, and so forth. Additionally or alternatively, operational metrics may be presented visually, e.g., as a heat map that spatially conveys the quality of performance of an agricultural task across a large field, such as agricultural field 112.

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figure 2:
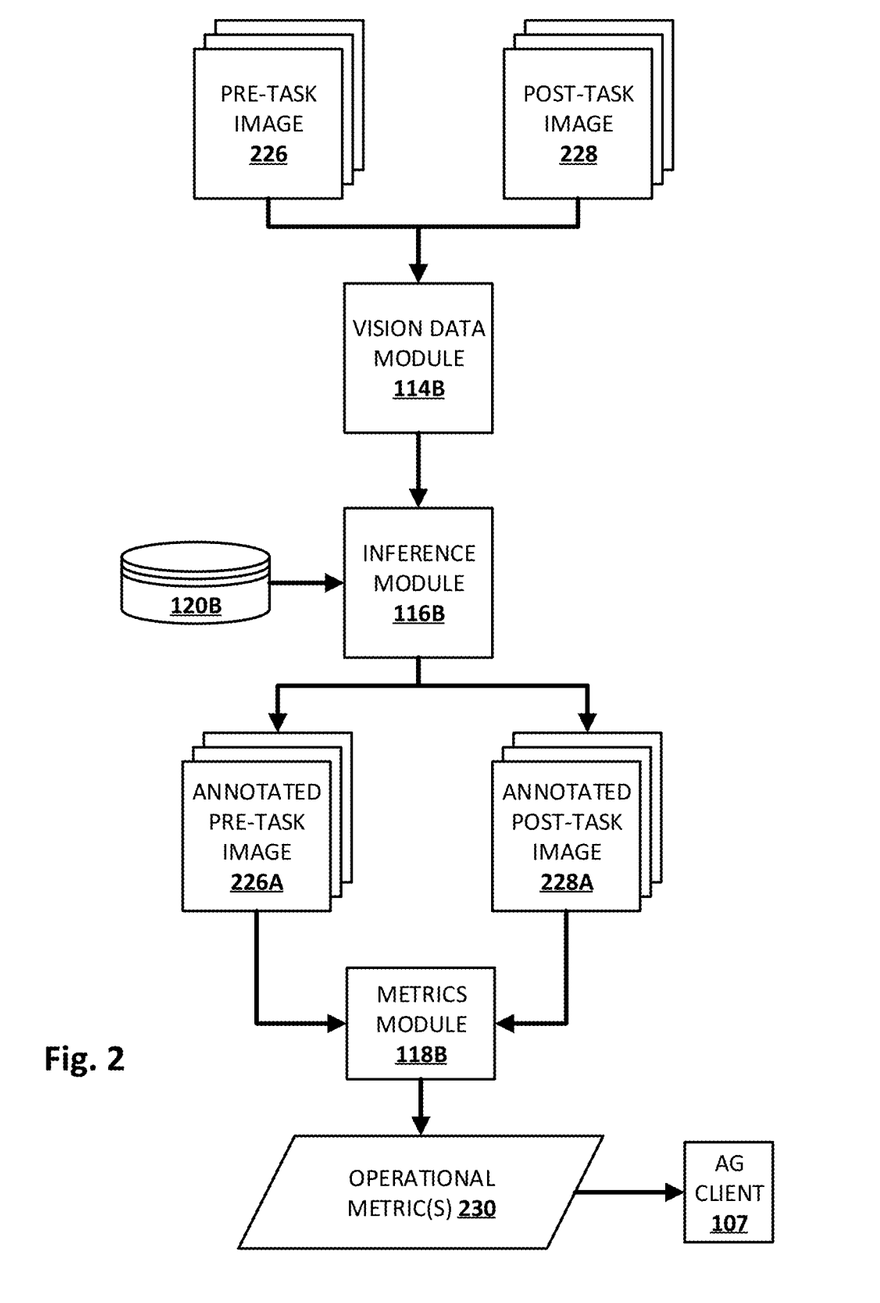
FIG. 2 schematically depicts components and a process for practicing selected aspects of the present disclosure, in accordance with various implementations.

FIG. 2 schematically depicts how various elements depicted in FIG. 1 may process data to generate auditable inferences from vision data of crops, and how performance metrics may be determined from those auditable inferences. Starting at top, pre-task images 226 and post-task images 228 may be captured, e.g., using one or more ground-level vision sensors such as RGB cameras, RGBd cameras, stereoscopic cameras, vision sensors that operate in different spectral wavelengths than RGB (e.g., infrared, X-ray), and so forth.

Pre-task images 226 may capture crops in a field at some moment in time prior to performance of an agricultural task. In some implementations, this moment may occur immediately before performance of the task. For example, a vision sensor may be mounted on a front portion of a boom of a tractor travelling through agricultural field 112. This vision sensor may capture overhead images of crops just before one or more pieces of equipment on the tractor's boom performs some agricultural task, such as harvesting, spraying weeds, watering, etc.

In other implementations, pre-task images 226 may be captured earlier by another vision sensor, e.g., minutes, hours, or even days before performance of the agricultural task. To account for changes in plants over time (e.g., growth, damage from environmental influences), in some such implementations, a confidence measure assigned to pre-task images 226, to inferences drawn therefrom, or to operational metrics calculated downstream, may be weighted in proportion to a time interval between their capture and performance of the agricultural task. In some cases, the greater the time interval, the lesser the confidence, and vice versa.

Post-task images 228 may capture the same crops at some point in time after the agricultural task is performed. In some implementations, post-task images 228 may be captured almost immediately after performance of the agricultural tasks. For example, another vision sensor may be mounted on a backside of the same agricultural vehicle as the front-side vision sensor.

In other implementations, post-task images 228 may be captured later, e.g., minutes, hours, or even days after performance of the agricultural task. Similar to before, changes in plants over time (e.g., growth, damage from environmental influences) may be accounted for. Accordingly, in some such implementations, a confidence measure assigned to post-task image(s) 228, to inferences drawn therefrom, or to operational metrics calculated downstream, may be weighted in proportion to a time interval between performance of the agricultural task and capture of post-task images 228. In some cases, the greater the time interval, the lesser the confidence, and vice versa.

Pre-task images 226 and post-task images 228 may be provided, e.g., by vision data module 114B, to inference module 116B. Inference module 116B may process these images 226/228 based on one or more machine learning models contained in edge database 120B to generate a plurality of pre-task inferences and a plurality of post-task inferences about the agricultural plot. In some implementations, if a suitable model is not available in edge database 120B, inference module 116B may request and/or retrieve a suitable model, e.g., from database 120A of central agricultural inference system 104A. In some implementations, the plurality of pre-task inferences and the plurality of post-task inferences may be provided by inference module 116B as part of annotated pre-task images 226A and annotated post-task images 228A.

The pluralities of pre-task and post-tasks inferences may take various forms, depending on the nature of the agricultural task performed, the machine learning model(s) used, etc. As one example, if the agricultural task is to harvest strawberries, then the machine learning model(s) may include a CNN that is trained to annotate strawberries, or even ripe strawberries (to the exclusion of unripe strawberries, which should remain on the plant longer) with annotations such as bounding boxes, pixel-wise annotations, etc. As another example, if the agricultural task is to remediate weeds, then the machine learning model(s) may include one or more CNNs that are trained to annotate one or more types of weeds with annotations such as bounding boxes, pixel-wise annotations, etc. In other implementations, inference(s) drawn by inference module 116B may take forms other than annotations, such as classifications, predicted crop yields, recommended agricultural practices (e.g., more/less irrigation), and so forth.

Metrics module 118B may be configured to analyze inferences drawn by inference module 116B in order to determine, calculate, or otherwise ascertain operational metrics 230 (e.g., statistics, generalities, summaries etc.) that describe, appraise, or otherwise judge the quality and/or efficiency of performance of the agricultural task. In FIG. 2, for instance, metrics module 118B may compare the annotated pre-task images 226A to the annotated post-task images 228A to generate one or more operational metrics 230 about the performance of the agricultural task in an agricultural plot. These operational metrics may then be provided, for instance, to agricultural client 107 for presentation to the user.

Operational metrics 230 may take a variety of forms depending on a variety of factors, such as the nature of the agricultural task, the nature of the pre-task and post-inferences drawn by inference module 116B, the nature of the pre-task images 226 and/or post-task images 228 themselves, the one or more machine learning models employed by inference module 116B, etc. In some implementations in which the pre-task and post-task inferences are bounding boxes around objects of interest (e.g., a weed, a plant-part-of-interest, etc.), one operational metric may be determined by comparing a pre-task count of bounding boxes in annotated pre-task images 226A to a post-task count of bounding boxes in annotated post-task images 228A. The difference between these counts may be presented as a raw number, a percentage (e.g., percentage of ripe strawberries harvested, percentage of weeds remediated), a distribution, and so forth.

Figure 4:
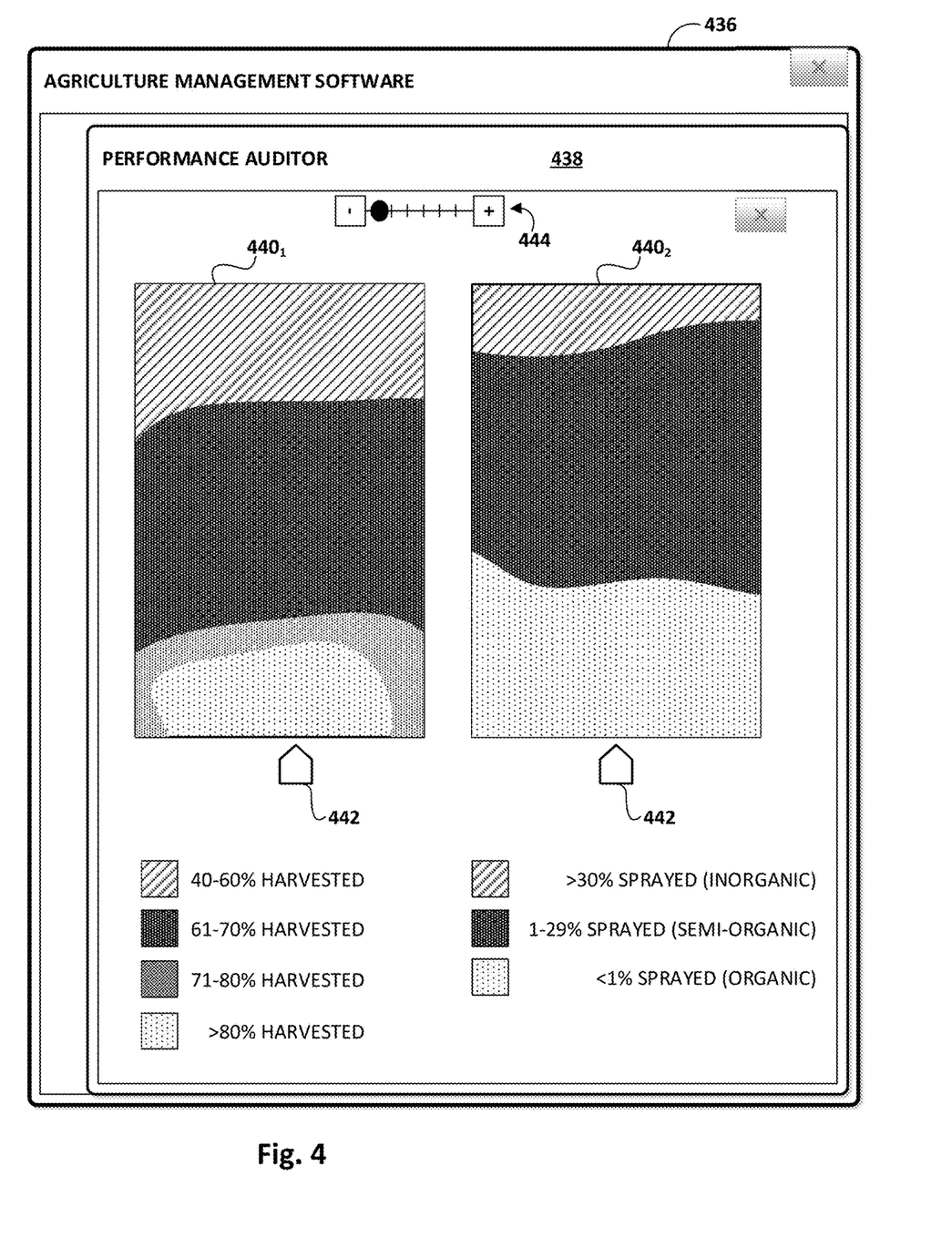
FIG. 4 schematically depicts an example graphical user interface for displaying operational metrics, in accordance with various implementations described herein.

In some implementations, an operational metric generated by metrics module 118B may account for spatial distribution of inferences drawn by inference module 116B. For example, metrics module 118B may generate a heat map that visually and spatially indicates areas of an agricultural field in which performance of the agricultural task satisfied various criteria and/or thresholds. Non-limiting examples of heat maps are illustrated in FIG. 4.

Figure 3A:
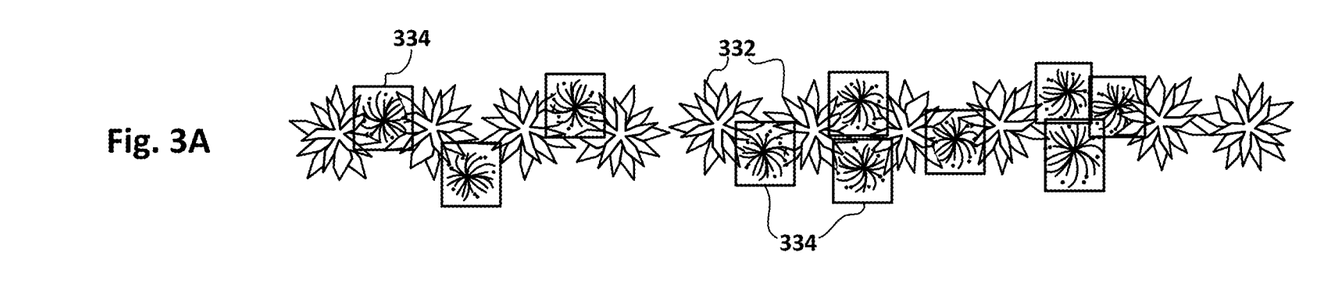
FIG. 3A, FIG. 3B, and FIG. 3C depict examples of pre-task and/or post-task imagery, and auditable inferences that may be drawn therefrom, in accordance with various implementations.

FIG. 3A depicts an example of how annotations may be used in image(s) of a row of plants 332 to identify ten weeds interspersed in the row. Only two plants 332 are identified for the sake of clarity. The ten weeds are encompassed by bounding boxes 334 (only three of which are identified for the sake of clarity). FIG. 3A may be an example of pre-task image(s) 226 that show the state of the plants prior to performance of the agricultural task, which in this case may be weed remediation.

Figure 3B:
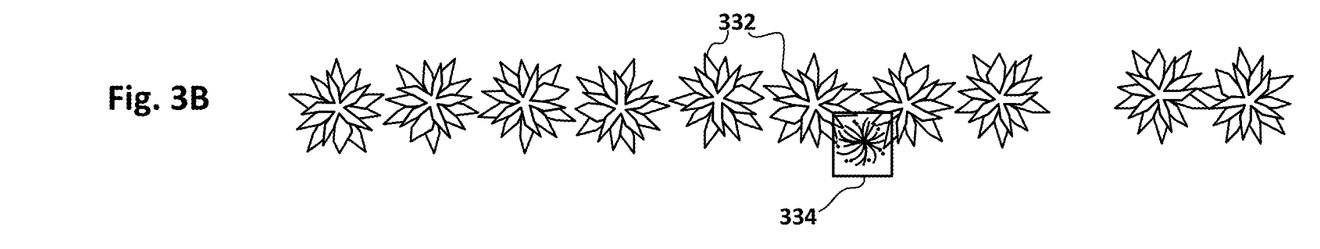

FIG. 3B depicts the same row of plants after performance of an agricultural task of mechanical weed remediation. As indicated by the lone bounding box 334 in FIG. 3B, nine of the ten weeds were successfully remediated. Accordingly, one operational metric that may be generated is 90% weed remediation efficacy. Additionally, due to the absence of any trace of the nine remediated weeds, it can also be inferred that the weed remediation was performed mechanically by removing the weeds.

Figure 3C:
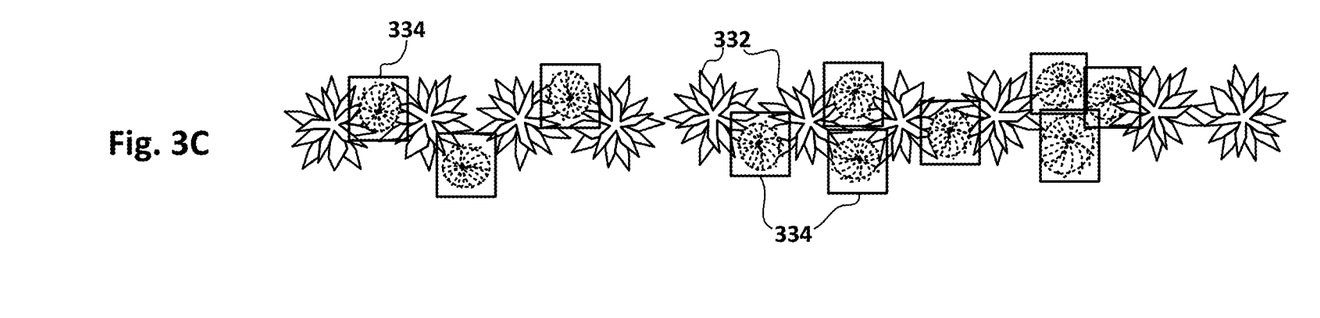

By contrast, FIG. 3C depicts the same robot of plants after performing an agricultural task of chemical weed remediation. For example, the ten weeds may have been sprayed with an herbicide, causing them to wilt, lodge, or otherwise die in place. As a consequence, and as indicated by the ten bounding boxes 334 in FIG. 3C, the remains of the chemically-remediated weeds are still detectable. Since all ten weeds were successfully remediated, one operational metric that may be generated is 100% weed remediation efficacy.

However, various farming practices, such as organic farming, may prohibit or limit the use of chemicals to perform tasks such as weed remediation. If organic farming is the goal, the outcome depicted in FIG. 3C may be undesirable. Accordingly, in some implementations, a first operational metric may include, for instance, a proportion of weeds in an agricultural plot that were treated mechanically or chemically. In some such implementations, a second operational metric of the operational metrics may be determined based on such a first operational metric. For example, the second operational metric may indicate whether the agricultural task complied with an organic farming standard. In FIG. 3B, the answer would be yes, but in FIG. 3C, the answer would be no.

FIG. 4 schematically depicts a graphical user interface (GUI) 436 that may be presented as part of agricultural client 107 to convey audit results to a user. GUI 436 includes a performance auditor window 438 that renders performance audit results. In this example, two heat maps, $440_1$ and $440_2$, are rendered in performance auditor window 438. Each heat map represents an overhead perspective of an agricultural plot (e.g., 112). A building 442 is depicted adjacent heat maps $440_{1-2}$ to demonstrate the agricultural plots' relative positions on a farm.

As indicated by the legend at bottom, in first heat map $440_1$, a first color (or shade, or pattern fill) represents areas of the agricultural plot in which 40-60% of ripe plant-parts-of-interest were harvested. A second color represents areas of the agricultural plot in which 61-70% of ripe plant-parts-of-interest were harvested. A third color represents areas of the agricultural plot in which 71-80% of ripe plant-parts-of-interest were harvested. A fourth color represents areas of the agricultural plot in which greater than 80% of ripe plant-parts-of-interest were harvested. It can be seen that the area of the agricultural plot closest to building 442 was harvested most effectively, with the efficacy decreasing at greater distances from building 442. This may be because, for instance, the party tasked with harvesting fruit/vegetables may be more careful to harvest fruit/vegetables more efficiently near building 442, as they may assume those areas are more likely to be visually inspected.

Second heat map $440_2$ may be generated based on performance of a second agricultural task, namely, weed remediation. This second agricultural task need not have been performed at the same time as, or even contemporaneously with, performing of the harvesting agricultural task represented by first heat map $440_1$. In second heat map $440_2$, a first color represents areas of the agricultural plot in which greater than 30% of detected weeds were sprayed with herbicide. These sprayed weeds may be detected, for instance, by inference module 116B detecting lodged or otherwise wilted weeds after weed remediation (as shown in FIG. 3C), as opposed to the previously-detected weeds being removed entirely (as shown in FIG. 3B). These areas may represent a clear deviation from organic farming practices, for instance. A second color represents areas of the agricultural plot in which 1-29% of detected weeds were sprayed with herbicide. These areas may represent a lesser deviation from organic farming practices than the first areas represented by the first color. In some cases, the second color may not satisfy strict organic farming practices, but may satisfy some other standard or regulation, such as pollution-reduction regulations, runoff reduction regulations, semi-organic farming regulations, etc.

A third color represents areas of the agricultural plot in which less than 1% of detected weeds were sprayed with herbicide. In some cases, the areas colored with the third color may qualify as organically-farmed. GUI 436 may include any number of controls that enable a user to view other operational metrics about performance of various tasks, such as the harvesting represented by first heat map $440_1$ or the weed remediation represented by second heat map $440_2$. As one example, a scroll bar 444 may allow the user to zoom in or out from heat maps $440_{1-2}$. Zooming in may, for instance, result in the heat map being redrawn or updated with more granular distinctions than those depicted in FIG. 4. Zooming out may, for instance, result in the heat map being redrawn or updated with more general distinctions than those depicted in FIG. 4.

Figure 5:
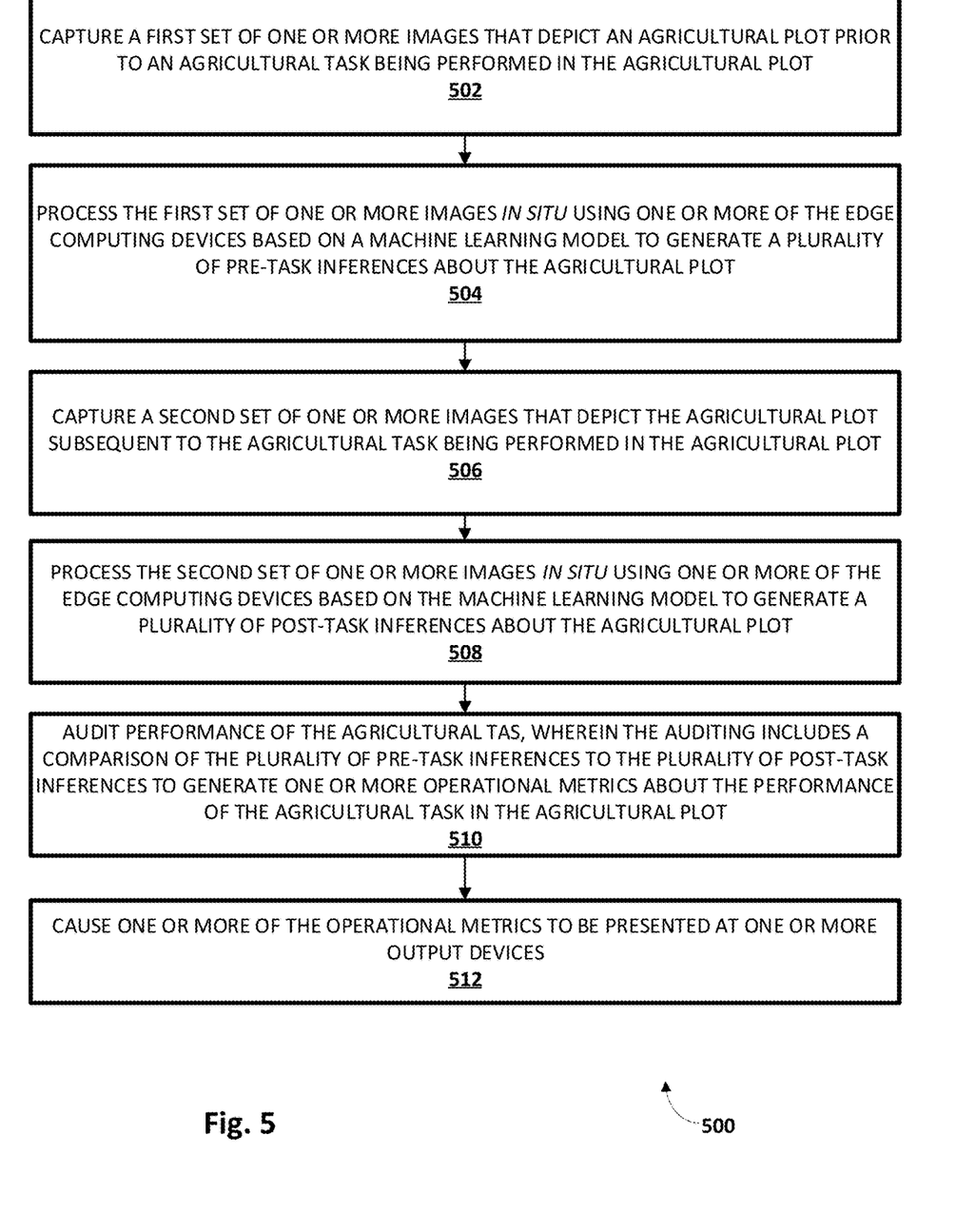
FIG. 5 is a flowchart of an example method in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein, such as by agricultural inference system 104, particularly edge agricultural inference system 104B. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system may capture, e.g., using one or more vision sensors, a first set of one or more images (e.g., 226) that depict an agricultural plot prior to an agricultural task being performed in the agricultural plot. These vision sensor(s) may be integral with agricultural robots (ground-based or air-based), mounted on farm equipment such as tractors or irrigation pivots, mounted on a fixed object such as a pole or cistern, or even carried through the field by agricultural personnel.

At block 504, the system, e.g., by way of inference module 116B, may process the first set of one or more images in situ using one or more of the edge computing devices (e.g., $108_3$, or one or more other computing devices that implement edge agricultural inference system 104B). In various implementations, this processing may be based on a machine learning model, and may generate a plurality of pre-task inferences (e.g., 226A) about the agricultural plot.

At block 506, the system may capture, using one or more of the vision sensors, a second set of one or more images (e.g., 228) that depict the agricultural plot subsequent to the agricultural task being performed in the agricultural plot. As was the case previously, these ground-level vision sensor(s) may be integral with agricultural robots (ground-based or air-based), mounted on farm equipment such as tractors or irrigation pivots, mounted on a fixed object such as a pole or cistern, or even carried through the field by agricultural personnel. In some implementations, the post-task vision data may be captured by vision sensors that are mounted on a vehicle behind those vision sensors used to capture the pre-task vision data.

At block 508, the system, e.g., by way of inference module 116B, may process the second set of one or more images in situ using one or more of the edge computing devices. In some implementations, the processing of block 508 may be based on the same machine learning model as was used in block 504, and may result in generation of a plurality of post-task inferences (e.g., 228A) about the agricultural plot. In other implementations, different machine learning models may be employed at blocks 504 and 508. For example, a weed detection CNN may be employed at inference module 116B at block 504 to get a baseline reading of the prevalence of weeds. At block 508, a lodged-weed or lodged-plant CNN may be employed by inference module 116B to detect dead weeds on the ground.

At block 510, the system, e.g., by way of metrics module 118B, may audit performance of the agricultural task. In some implementations, this auditing may be performed in situ using one or more of the edge computing devices. In other implementations, this auditing may be performed in whole or in part at central agricultural inference system 104A, e.g., by way of inferences uploaded by edge agricultural inference system 104B. Uploading only the inferences drawn from the vision data, rather than the vision data itself, may conserve computing and/or network resources, and may preserve the privacy of the vision data.

In some implementations, this auditing may include comparing the plurality of pre-task inferences generated at block 504 to the plurality of post-task inferences generated at block 508 to generate one or more operational metrics about the performance of the agricultural task in the agricultural plot. These operational metrics may include, for instance, statistics, generalities, summaries, heat maps, various types of charts, etc. As one example, a bar chart may be rendered, e.g., at agricultural client 107, that shows percentages of ripe fruit/vegetables harvested, ripe fruit/vegetables left unharvested, unripe fruit/vegetables harvested, and/or unripe fruit/vegetables left unharvested. Another operational metric may be a map or statistic that conveys how thoroughly or effectively seeds were planted, which may be determined based on spatial consistency (or lack thereof) of detected plants, a count of empty sections where plants should be, etc.

Tillage practice is another agricultural task for which quality can be appraised using techniques described herein. For example, a machine learning model trained to classify images of the ground into different categories of tillage practice may be employed to determine how well a particular party tilled a field. Cover crop planting and/or distribution is another agricultural task that can be evaluated using techniques described herein.

Returning to FIG. 5, at block 512, the system may cause one or more of the operational metrics to be presented at one or more output devices, such as a display of client device 106. Non-limiting examples of operational metrics were depicted at heat maps $440_1$ and $440_2$ of FIG. 4.

Figure 6:
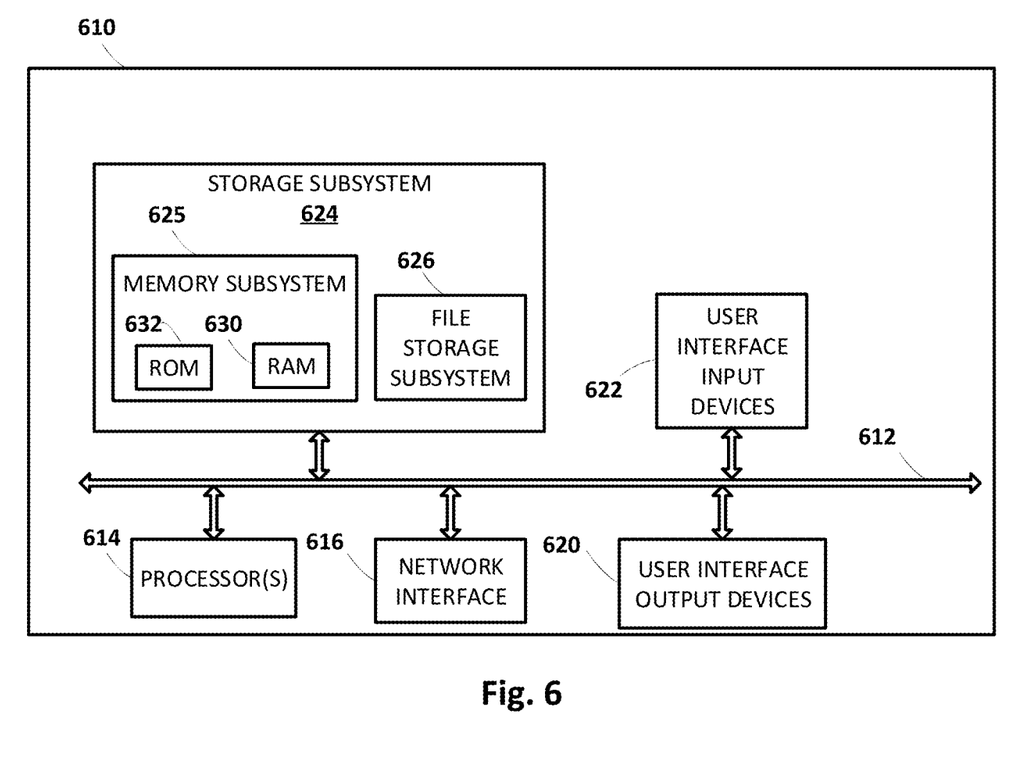
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more edge computing devices, the method comprising:
    capturing, using one or more ground-level vision sensors, a first set of one or more images that depict an agricultural plot prior to performance of an agricultural task performed in the agricultural plot;
    processing the first set of one or more images in situ using one or more of the edge computing devices based on a machine learning model to generate a plurality of pre-task inferences about the agricultural plot;
    capturing, using one or more of the ground-level vision sensors, a second set of one or more images that depict the agricultural plot subsequent to the performance of agricultural task in the agricultural plot;
    processing the second set of one or more images in situ using one or more of the edge computing devices based on the machine learning model to generate a plurality of post-task inferences about the agricultural plot;
    auditing performance of the agricultural task, wherein the auditing includes comparing the plurality of pre-task inferences to the plurality of post-task inferences to generate one or more operational metrics about the performance of the agricultural task in the agricultural plot; and
    causing one or more of the operational metrics to be presented at one or more output devices.

2. The method of claim 1, wherein the one or more operational metrics include a heat map of the agricultural plot.

3. The method of claim 2, wherein portions of the heat map are colored or shaded based on relative changes between the pre-task and post-task states of the agricultural plot.

4. The method of claim 1, wherein the machine learning model comprises a weed detection model, and one or more of the operational metrics convey effectiveness of weed remediation.

5. The method of claim 4, wherein one or more of the operational metrics indicates a measure of weeds that were left unremediated.

6. The method of claim 4, wherein a first operational metric of the one or more of the operational metrics indicates a proportion of weeds in the agricultural plot that were treated mechanically or chemically.

7. The method of claim 6, wherein a second operational metric of the operational metrics is determined based on the first operational metric, and the second operational metric indicates whether the agricultural task complied with an organic farming standard.

8. The method of claim 1, wherein the machine learning model is trained to generate an inference that identifies a targeted plant part.

9. The method of claim 8, wherein the agricultural task is harvesting the targeted plant part, and one or more of the operational metrics indicates a decrease in instances of the targeted plant part being detected in the second set of one or more images relative to the first set of one or more images.

10. The method of claim 8, wherein the agricultural task is harvesting the targeted plant part, and one or more of the operational metrics comprises a measure of ripe fruits or vegetables that were left unharvested.

11. The method of claim 8, wherein the agricultural task is harvesting the targeted plant part, and one or more of the operational metrics comprises a measure of unusable fruits or vegetables that were harvested.

12. An edge computing device comprising one or more processors and memory storing instructions that, in response to execution of the instructions, cause the one or more processors to:
    capture, using one or more ground-level vision sensors, a first set of one or more images that depict an agricultural plot prior to performance of an agricultural task in the agricultural plot;
    process the first set of one or more images in situ based on a machine learning model to generate a plurality of pre-task inferences about the agricultural plot;
    capture, using one or more of the ground-level vision sensors, a second set of one or more images that depict the agricultural plot subsequent to the performance of the agricultural task in the agricultural plot;
    process the second set of one or more images in situ based on the machine learning model to generate a plurality of post-task inferences about the agricultural plot;
    trigger an audit of performance of the agricultural task, wherein the audit includes a comparison of the plurality of pre-task inferences to the plurality of post-task inferences to generate one or more operational metrics about the performance of the agricultural task in the agricultural plot; and
    cause one or more of the operational metrics to be presented at one or more output devices.

13. The system of claim 12, wherein the one or more operational metrics include a heat map of the agricultural plot.

14. The system of claim 13, wherein portions of the heat map are colored or shaded based on relative changes between the pre-task and post-task states of the agricultural plot.

15. The system of claim 12, wherein the machine learning model comprises a weed detection model, and one or more of the operational metrics convey effectiveness of weed remediation.

16. The system of claim 15, wherein one or more of the operational metrics indicates a measure of weeds that were left unremediated.

17. The system of claim 15, wherein a first operational metric of the one or more of the operational metrics indicates a proportion of weeds in the agricultural plot that were treated mechanically or chemically.

18. A non-transitory computer-readable medium comprising instructions that, in response to execution of the instructions by a processor of an edge computing device, cause the processor to:
    capture, using one or more ground-level vision sensors, a first set of one or more images that depict an agricultural plot prior to performance of an agricultural task in the agricultural plot;
    process the first set of one or more images in situ based on a machine learning model to generate a plurality of pre-task inferences about the agricultural plot;
    capture, using one or more of the ground-level vision sensors, a second set of one or more images that depict the agricultural plot subsequent to the performance of the agricultural task in the agricultural plot;
    process the second set of one or more images in situ based on the machine learning model to generate a plurality of post-task inferences about the agricultural plot;
    trigger an audit of performance of the agricultural task, wherein the audit includes a comparison of the plurality of pre-task inferences to the plurality of post-task inferences to generate one or more operational metrics about the performance of the agricultural task in the agricultural plot; and cause one or more of the operational metrics to be presented at one or more output devices.

19. The non-transitory computer-readable medium of claim 18, wherein the one or more operational metrics include a heat map of the agricultural plot.

20. The non-transitory computer-readable medium of claim 18, wherein the machine learning model comprises a weed detection model, and one or more of the operational metrics indicates a measure of weeds that were left unremediated or a proportion of weeds in the agricultural plot that were treated mechanically or chemically.

* * * * *